(12) United States Patent
Kapoor

(10) Patent No.: US 8,189,657 B2
(45) Date of Patent: May 29, 2012

(54) SYSTEM AND METHOD FOR TIME OPTIMIZED ENCODING

(75) Inventor: Anand Kapoor, Paramount, CA (US)

(73) Assignee: Thomson Licensing, LLC, Boulogne-Billancourt (FR)

( * ) Notice: Subject to any disclaimer, the term of this patent is extended or adjusted under 35 U.S.C. 154(b) by 318 days.

(21) Appl. No.: 12/664,432

(22) PCT Filed: Jun. 14, 2007

(86) PCT No.: PCT/US2007/014015
§ 371 (c)(1),
(2), (4) Date: Dec. 14, 2009

(87) PCT Pub. No.: WO2008/153525
PCT Pub. Date: Dec. 18, 2008

(65) Prior Publication Data
US 2010/0172405 A1    Jul. 8, 2010

(51) Int. Cl.
*H04N 11/04* (2006.01)
(52) U.S. Cl. .......... 375/240.01; 375/240.1; 375/240.26
(58) Field of Classification Search ............. 375/240.01, 375/240.1, 240.26
See application file for complete search history.

(56) References Cited

U.S. PATENT DOCUMENTS

| | | | | |
|---|---|---|---|---|
| 6,522,693 B1* | 2/2003 | Lu et al. | ............... | 375/240.02 |
| 6,721,361 B1* | 4/2004 | Covell et al. | ............. | 375/240.14 |
| 6,928,233 B1* | 8/2005 | Walker et al. | ................. | 386/241 |
| 2002/0003881 A1* | 1/2002 | Reitmeier et al. | ............ | 380/210 |
| 2002/0057739 A1* | 5/2002 | Hasebe et al. | ........... | 375/240.01 |
| 2003/0012275 A1* | 1/2003 | Boice et al. | .............. | 375/240.01 |
| 2003/0103564 A1 | 6/2003 | Hanaki | | |
| 2005/0053131 A1 | 3/2005 | Domke et al. | | |
| 2005/0207497 A1* | 9/2005 | Rovati et al. | ............. | 375/240.16 |
| 2006/0114995 A1* | 6/2006 | Robey et al. | ............. | 375/240.12 |
| 2006/0239343 A1 | 10/2006 | Mohsenian | | |
| 2008/0019610 A1* | 1/2008 | Matsuzaka et al. | .......... | 382/284 |
| 2008/0075164 A1* | 3/2008 | Matsumura | ............. | 375/240.12 |

FOREIGN PATENT DOCUMENTS

WO    WO2007/005750    1/2007

OTHER PUBLICATIONS

Farin et al.: "SAMPEG, A Scene Adaptive Parallel MPEG-2 Software Encoder", Proceedings of the SPIE, Bellingham, VA, vol. 4310, Jan. 1, 2001, pp. 272-293, XP008012121.
Bozoki et al.: "Scene Adaptive Rate Control in a distributed parallel MPEG Video Encoder", Proceedings of the International Conference on Image Processing, ICIP 1997, vol. 2, Oct. 28, 1997, Los Alamitos, CA, IEEE, US, pp. 780-783, XP002145906.
Srinivasan et al.: "Windows Media Video 9: Overview and Applications", Signal Processing, Image Communication, Elsevier Science Publishers, Amsterdam, NL, vol. 19. No. 9, Oct. 1, 2004, pp. 851-875. XP004607151.
Search Report dtd Jun. 26, 2008.

* cited by examiner

*Primary Examiner* — Christopher S Kelley
*Assistant Examiner* — Jonathan Torchman
(74) *Attorney, Agent, or Firm* — Robert D. Shedd; Vincent E. Duffy

(57) ABSTRACT

The present disclosure is directed towards a system and method for time optimized encoding. Time optimized encoding maximizes the usage of the multiple encode nodes or clusters by parallelizing time-intensive encoding with minimal or no sacrifice of encoding quality. Thereby, reducing the time required for accomplishing the time intensive encoding and increasing the efficient throughput of multiple encodes through the system.

16 Claims, 4 Drawing Sheets

SYSTEM AND METHOD FOR TIME OPTIMIZED ENCODING

This application claims the benefit under 35 U.S.C. §365 of International Application PCT/US2007/014015, filed Jun. 14, 2007, which was published in accordance with PCT article 21(2) on Dec. 18, 2008, in English.

TECHNICAL FIELD OF THE INVENTION

The present invention generally relates to encoding video content, and more particularly, to time optimized encoding of video content.

BACKGROUND OF THE INVENTION

This section is intended to introduce the reader to various aspects of art that may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In the past, the video encoding process was a linear process handled by single piece of encoding hardware. This implementation was sufficient because the codecs used in the encoding hardware were simple and finished encodes within a reasonable amount of time. A new generation of video codecs, such as the Advance Video Codec (AVC), have been developed to compress video more effectively to improve bit rate efficiency and provide superior video quality. However, the new video codecs have the drawback of being mathematically computationally intensive and, therefore, undesirably increasing the time period needed for video encoding.

Furthermore, there has been an ongoing effort to improve the quality of encodes by having codecs engage in multiple encoding passes. More specifically, having the codecs pass the content and analyze the content through multiple encoding passes. If the passes are dependant on each other, each pass must wait for a previous pass to complete. This increases the time needed to complete multipass encodes and, as a result, also has the drawback of undesirably increasing the time period needed for video encoding.

The present disclosure is directed towards overcoming these drawbacks.

SUMMARY

The present disclosure is directed towards a system and method for time optimized encoding. Time optimized encoding maximizes the usage of the multiple encode nodes or clusters by parallelizing time-intensive encoding with minimal or no sacrifice of encoding quality. Thereby, reducing the time required for accomplishing the time intensive encoding and increasing the efficient throughput of multiple encodes through the system.

One aspect of the present disclosure is directed towards a method for encoding video content, the method including receiving the video content, segmenting the video content into a plurality of scenes, detecting if a scene has a length that exceeds a first limit, dissecting the scene into scene segments if the length of the scene exceeds the first limit, and encoding the dissected scenes in parallel.

Another aspect of the present disclosure is directed towards an apparatus or system for encoding video content, the apparatus including means for receiving the video content, means for segmenting the video content into a plurality of scenes, means for detecting if a scene has a length that exceeds a first limit, means for dissecting the scene into scene segments if the length of the scene exceeds the first limit, and means for encoding the dissected scenes in parallel.

BRIEF DESCRIPTION OF THE DRAWINGS

These, and other aspects, features and advantages of the present invention will be described or become apparent from the following detailed description of the preferred embodiments, which is to be read in connection with the accompanying drawings.

In the drawings, wherein like reference numerals denote similar elements throughout the views.

Figure 1:
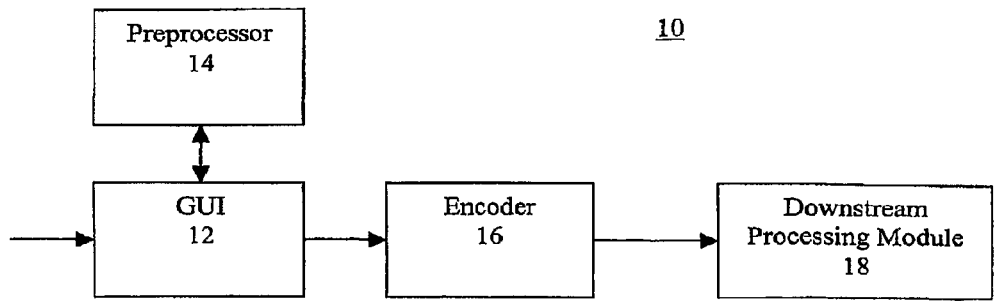
FIG. 1 is a block diagram illustrating an exemplary system using an encoder in accordance with the present disclosure.

It should be understood that the drawing(s) is for purposes of illustrating the concepts of the invention and is not necessarily the only possible configuration for illustrating the invention.

DETAILED DESCRIPTION OF PREFERRED EMBODIMENTS

It should be understood that the elements shown in the Figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventors to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring now to FIG. 1, a block diagram showing an embodiment of the present disclosure used in an encoding arrangement or system 10 is shown. Encoding arrangement 10 includes a graphical user interface (GUI) 12 hosted, for example, on a node (not shown) and operatively connected to a preprocessor 14 and an encoder 16, such as an Advanced Video Encoding (AVC) encoder, operatively connected, in turn, to a downstream processing module 18. An uncompressed motion picture video content datastream containing a series of still image frames is received at the input of GUI 12.

In operation, GUI 12 provides access to the uncompressed motion picture video content datastream to the preprocessor 14. Preprocessor 14 using an integral scene detection module (not shown) detects a new scene in the received uncompressed motion picture video content datastream and transmits a scene detection signal to GUI 12 indicating that a new group of pictures (GOP) needs to be encoded. The scene detection signal may include timestamps, pointers, synchronization data, or the like to indicate when and where the new GOP should occur. GUI 12 passes the uncompressed motion picture video content and control data (e.g., the scene detection signals discussed above and/or additional control data discussed below) to encoder 16. Utilizing the control data received from GUI 12, encoder 16, operating in accordance with standards developed by the Moving Pictures Experts Group (MPEG), for example, converts the uncompressed datastream into a compressed datastream containing a GOP beginning with an intra-coded frame (I-frame) in which encoded video content data corresponds to visual attributes (e.g., luminance, chrominance) of the original uncompressed still image. Subsequent frames in the GOP, such as predictive coded frames (P-frames) and bi-directional coded frames (B-frames), are encoded based on changes from earlier frames in the group. Conventionally, new groups of frames, and thus new I-frames, are begun at scene changes when the video content data changes are large because less data is required to describe a new still image than to describe the large changes between the adjacent still images. As discussed below, the present disclosure is directed towards a time optimized encoding technique that may alter when new groups of frames are begun.

After the uncompressed data stream is compressed by encoder 16, the compressed datastream is passed to a downstream processing module 18 that performs additional processing on the compressed data so the compressed data can be stored (e.g., in a hard disk drive (HDD), digital video disk (DVD), high definition digital video disk (HD-DVD) or the like), transmitted over a medium (e.g., wirelessly, over the Internet, through a wide area network (WAN) or local area network (LAN) or the like), or displayed (e.g., in a theatre, on a digital display (e.g., a plasma display, LCD display, LCOS display, DLP display, CRT display) or the like).

Figure 2:
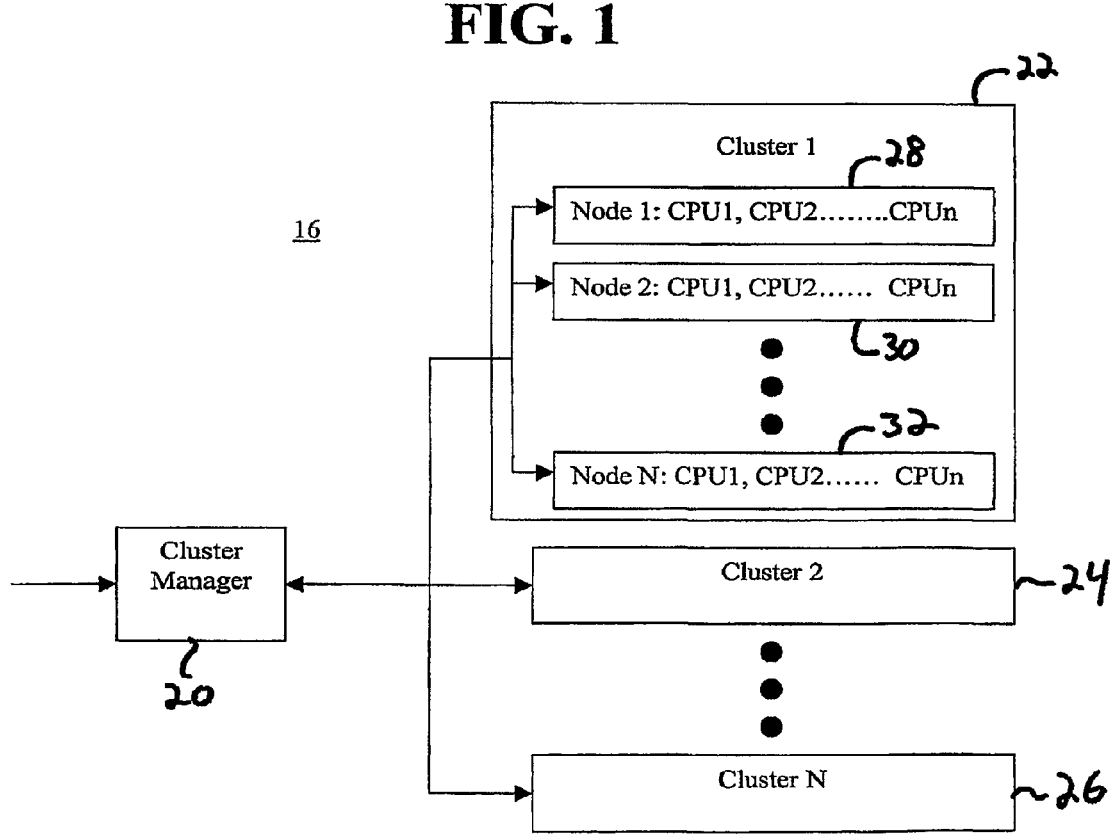
FIG. 2 is a block diagram of an exemplary encoder arrangement in accordance with the present disclosure.

Referring now to FIG. 2, a block diagram of an exemplary encoder arrangement 16 in accordance with the present disclosure is shown. Encoder arrangement 16 includes a cluster manager 20 operatively connected to a plurality of clusters 22-26. Each cluster 22-26 contains a plurality of nodes 28-32 that, in turn, contain a plurality of central processing units (CPUs). In operation, cluster manager 20 receives the uncompressed motion picture video content and control data from GUI 12 and may also receive feedback data from the nodes 28-32 in clusters 22-26. Based on the control data, and any provided feedback data, cluster manager 20 segments the uncompressed motion video content into groups of frames and passes the groups of frames to the nodes 28-32 of the clusters 22-26 as discussed in further detail below.

Figure 3:
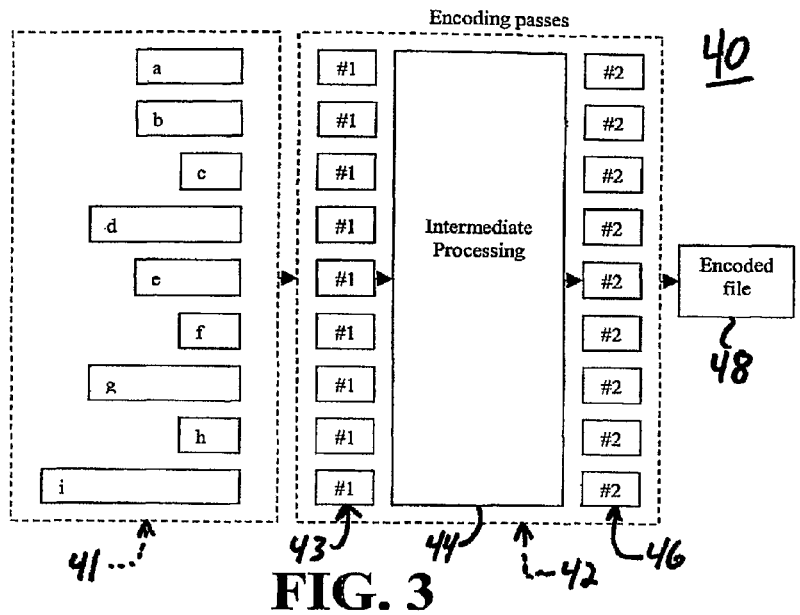
FIG. 3 is an illustration of a conventional encoding workflow.

Referring now to FIG. 3, a conventional encoding workflow 40 is shown. The conventional encoding workflow includes the cluster manager 20 receiving uncompressed motion video content and segmenting 41 the uncompressed motion video content into scenes (a-i) based on control data such as scene detection signals generated by preprocessor 14. After segmentation, cluster manager 20 may provide the scenes (a-i) to the clusters 22-26 and the clusters 22-26 may perform multiple encoding passes 42 on the scenes (a-i). For example, a first encoding pass 43 may include providing each scene to a different node 28-32 of clusters 22-26 so each node 28-32 can analyze the complexity (e.g., motion between scene frames, color variation between frames, etc.) of an assigned scene (a-i). Intermediate processing 44 may include one node 28 of a cluster 22 aggregating the results of the first encoding pass 43 into a single log file or metadata file. Intermediate processing 44 may also include additional processing such as, but not limited to, formatting adjustment based on instructions received by the node 28 from the cluster manager 20. Afterwards, during a second encoding pass 46 the cluster manager provides each scene (a-i), along with the metadata file and any additional instructions, to a different node 28-32 of clusters 22-24 so each node 28-32 can process an assigned scene in accordance with the metadata file and any additional instructions to generate an AVC file for the assigned scene. The AVC files may then be aggregated into an encoded file 48 containing compressed motion video content that can be passed to a downstream processing module 18 for additional processing, as discussed above.

It should be appreciated that due to the random nature of the video content it is likely that scenes may have variable scene lengths or sizes. Longer scenes are likely to take longer to go through an encoding pass than shorter scenes. Furthermore, a longer scene may require nodes processing shorter scenes to wait and enter a standby mode, thereby wasting valuable processing resources and reducing processing efficiency, until the encoding pass for the longer scene is completed so all the scenes can move onto the next encoding pass. As a result, the conventional parallel scene-processing approach slows down the throughput of the current cutting-edge encoding process.

Returning now to FIG. 3, the drawbacks of the conventional parallel scene-processing approach are further illustrated. Scenes (a-i) may have variable lengths. For example scene (i) is longer, i.e. has more frames, than scene (c). Additionally, if intermediate processing 44 is carried out by a single node, as shown, then the first encoding pass 43 must be completed before the intermediate processing 44 can be started. As a result, the length of scene (i) slows the throughput of the encoding workflow 40.

Figure 4:
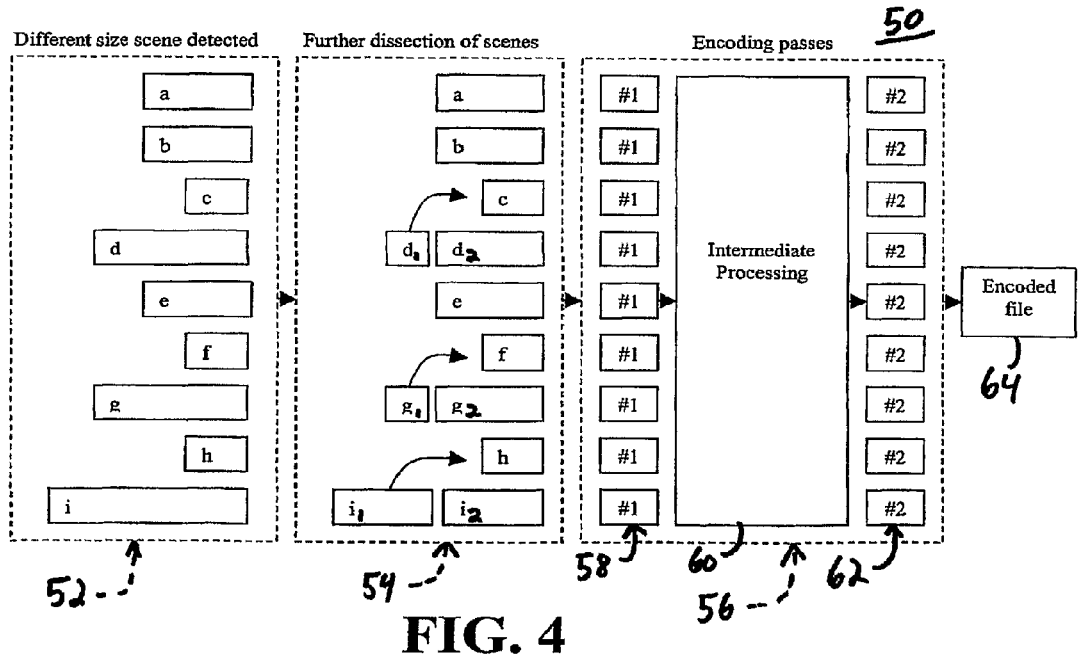
FIG. 4 is an illustration of an encoding workflow in accordance with the present disclosure.

Referring now to FIG. 4, an encoding workflow 50 in accordance with the present disclosure is shown. The encoding workflow 50 includes the cluster manager 20 receiving uncompressed motion video content and segmenting 52 the uncompressed motion video content into scenes (a-i) based on control data such as, but not limited to, scene detection signals generated by preprocessor 14. After segmenting the uncompressed motion video content into scenes, the cluster manager 20 may further dissect 54 the scenes (a-i) based on, for example, GOP type and GOP size, as discussed in further detail below, before beginning the encoding passes 56. Some of the scenes are preferably further dissected to improve the throughput of all of the scenes (a-i) through the encoding passes 56 (i.e., first encoding pass 58, intermediate processing 60, and second encoding pass 62).

As shown in FIG. 4, scenes (a, b and e) may be considered to have an "average" length, scenes (c, f and h) may be considered to have a "short" length, and scenes (d, g and i) may be considered to have a "long" length. As discussed above, the longer scenes (d, g and i) are likely to slow the throughput of all the scenes (a-i) through encoding passes 56. Therefore, to improve the throughput the cluster manager 20 or the GUI 12 may further dissect 54 the longer scenes (d, g and i). For example, scenes (d, g and i) maybe dissected into two segments ($d_1$, $d_2$; $g_1$, $g_2$; and $i_1$, $i_2$) wherein one segment has an approximately average length (i.e., $d_2$, $g_2$ and $i_2$) and the other segment has a variable length that preferably is not greater than the average length (i.e., $d_1$, $g_1$ and $i_1$). It should be noted that scene segments exceeding the average length may be further dissected into smaller scene segments. After dissecting the scenes 54, the cluster manager may group the remainder segments (i.e., $d_1$, $g_1$ and $i_1$) with the shorter-length scenes (c, f and h) before providing the scenes to the clusters 22-26. The dissection and grouping of the scenes (a, b, $d_1$ and c, $d_2$, e, $g_1$ and f, $g_2$, $i_1$ and h, and $i_2$) increases the throughput of the scenes through the encoding passes 42 since the nodes 28-32 of the clusters 22-26 should complete an encoding pass on an assigned scene (i.e., a, b and e), dissected scene segment ($d_2$, $g_2$ and $i_2$), or grouped scene and dissected scene segment ($d_1$ and c, $g_1$ and f, and $i_1$ and h) at approximately the same time.

For example, a first encoding pass 58 may include providing each scene (i.e., a, b and e), dissected scene segment ($d_2$, $g_2$ and $i_2$), or grouped scene and dissected scene segment ($d_1$ and c, $g_1$ and f, and $i_1$ and h) in parallel to a different node 28-32 of clusters 22-26 so each node 28-32 can analyze the complexity (e.g., motion between scene frames, color variation between frames, etc.) of an assigned scene (i.e., a, b and e), dissected scene segment ($d_2$, $g_2$ and $i_2$), or grouped scene and dissected scene segment ($d_1$ and c, $g_1$ and f, and $i_1$ and h). Intermediate processing 60 may include one node 28 of a cluster 22 aggregating the results of the first encoding pass 58 into a single log file or metadata file. Intermediate processing 60 may also include additional processing such as, but not limited to, formatting adjustment based on instructions received by the node 28 from the cluster manager 20. Afterwards, during a second encoding pass 62 the cluster manager 20 provides each scene (i.e., a, b and e), dissected scene segment ($d_2$, $g_2$ and $i_2$), or grouped scene and dissected scene segment ($d_1$ and c, $g_1$ and f, and $i_1$ and h), along with the metadata file and any additional instructions, in parallel to a different node 28-32 of clusters 22-24 so each node 28-32 can process an assigned scene in accordance with the metadata file and any additional instructions to generate an AVC file for the assigned scene. The AVC files may then be aggregated into an encoded file 64 containing compressed motion video content that can be passed to a downstream processing module 18 for additional processing, as discussed above.

It should be appreciated that the dissection and grouping of the scenes overcomes the drawbacks otherwise encountered when encoding video content having scenes that have variable scene lengths or sizes. By dissecting and grouping the scenes the delay caused the encoding of long scenes is greatly reduced. The reduction of this delay increases the efficiency and throughput of the encoding process.

Figure 5:
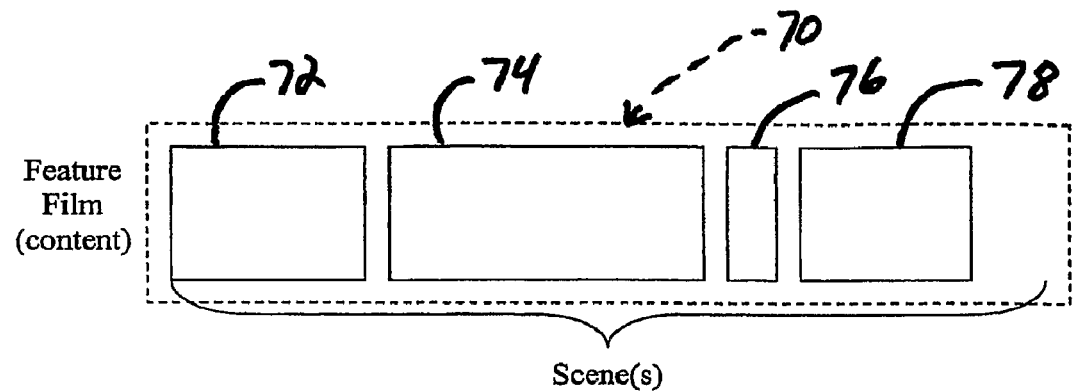
FIG. 5 is an illustration of scenes of film content in accordance with the present disclosure.

Referring now to FIG. 5, exemplary film content 70 is shown. Film content 70 may contain an arbitrary number of scenes 72-78. Each scene, in turn, may contain a variable number of frames (not shown).

Figure 6:
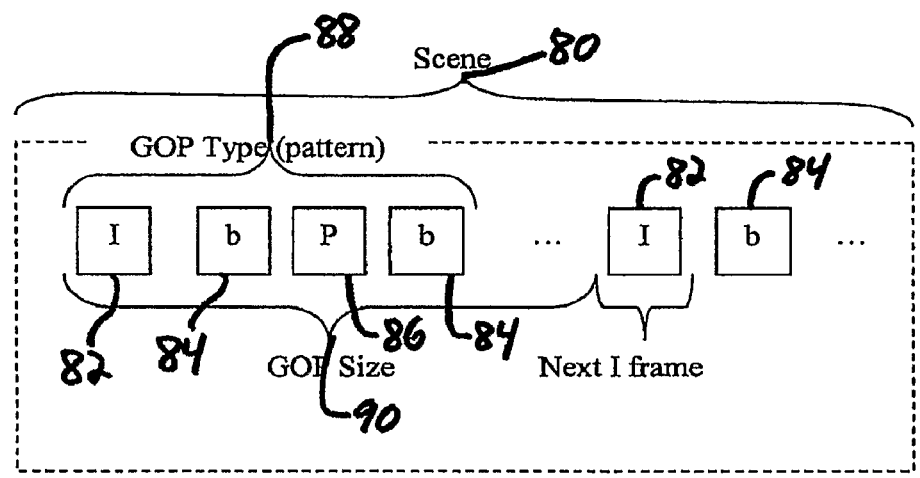
FIG. 6 is an illustration of Group of Picture (GOP) sizes and types within a scene in accordance with the present disclosure.

Referring now to FIG. 6, a compressed or encoded scene 80 is shown. The compressed scene 80 includes I-frames 82, B-frames 84 and P-frames 86. The I-frame 82 contains all the data required to show the frame in its entirety. The B-frames 84 and P-frames 86 are encoded based on changes from earlier frames in the group. Conventionally, an encoder encodes the film content 70 in accordance with a predetermined GOP type or pattern 88 until a predetermined group of pictures size 90 is reached. At that point, the encoder generates another I-frame and continues the encoding process in accordance with the predetermined GOP pattern and size. For example, one predetermined GOP pattern may be an I-frame followed by a repeating B-frame, P-frame, B-frame pattern. The predetermined GOP size may be 24 frames such that every $24^{th}$ frame is an I-frame. Other GOP patterns and sizes are known by those skilled in the art and are considered within the scope of the present disclosure.

Returning now to FIG. 2, in order to take the maximum use of the nodes 28-32 of clusters 22-26, thereby minimizing the encoding time required, the frames of all the scenes in the film could be divided equally among the nodes 28-32 of clusters 22-26. However, dividing the frames in an arbitrary manner would cause encoding performance to suffer since increasing the subdivision of scenes at arbitrary locations would introduce more I-frames than optimally necessary I-frames require retaining and storing all the picture information with the least amount of recycling of encoding information. Therefore, introducing unnecessary I-frames increases the bit-rate and also the file size of the video stream produced. As a result, the encoded file would not be of optimal file size.

Referring now to FIG. 6, since the GOP type 88 and GOP size 90 are known and remain constant throughout the encoding process, particular frames that would serve as the ideal position to automatically dissect the scenes can be predicted. Using this approach, an encoded file having the best encoding performance and optimal file size can be generated.

As discussed above, long scenes conventionally require an assigned node to encode the entire scene. But, in accordance with the present disclosure, the long scene can be further dissected at known I-frame positions within the scene. The dissected segments can then be provided in parallel to different nodes so the scene can be encoded in a shorter time period.

Pursuant to the present disclosure, a method of forecasting or determining optimal scene breaks to optimize parallelization may include the following steps. During encoding, a compressionist or user selects the GOP size 90 and GOP type 88. The GOP size 90 and type 88 may be used in conjunction with the scene boundary identification to determine which scenes to dissect and where the dissection should occur. Based on statistical data including, but not limited to, the length of the scenes, the number of GOPs within each scene, and the number of clusters 22-26 and/or nodes 28-32 available, a normalized distribution can be generated by an algorithm or process. In other words, all nodes would preferably have a substantially equal number of GOPs to process.

One exemplary algorithm or process for determining where to dissect or break a scene may include:
1. Obtaining the original number of scenes in the received video content (e.g., feature or film) that do not contain fades and dissolves.
2. Obtaining the number of frames within the received video content to be encoded.
3. Computing the number of GOPs (Go) required to encode above frames for each scene.
4. Creating a histogram distribution depending on the number of GOPs required for a given class length and number of scenes.
5. Taking the histogram and create a density curve for the histogram
6. Finding the mean, median, maximum, minimum and standard deviation for the density curve. In other words, the mean number of GOPs each node should contain for a balanced and optimal encoding throughput from the cluster.
7. Assuming the density curve is normal curve, i.e., the curve fits the normal family of curves for different scene sizes one can apply 68-95-99.7% rule (a.k.a. as the Rule For Normal Distributions) to figure out and dissect all the scene that lie beyond $1^{st}$ standard deviation 68% into smaller scenes at the GOP number dictated by the class. The height of the curve (or standard deviation) can depend on the number of nodes available. The larger the number of nodes available the smaller the standard deviation may be and hence smaller the number of GOPs the scene would contain.

It should be noted that, fades and dissolves may require additional I-frames depending on the encoding content and thereby have smaller or different GOP size than the usual. This is due to the fact that fade and dissolve are more complex scenes with possibly limited similarity between transition frames. The use of smaller or different GOP sizes would introduce more I-frames than optimally necessary. Therefore, an additional approach to optimize the encoding time, particularly when fade and/or dissolve scenes are involved, is by arranging the scenes according to increasing length of number of frames it contains The scenes are then distributed in the order of their length. In other words, longer scenes or complex scenes containing dissolves and/or fades are provided to the clusters or nodes before the shorter scenes. This allows the longer scenes to begin the encoding process early on, leaving the short scenes to take advantage of parallelization as other nodes become available.

Figure 7:
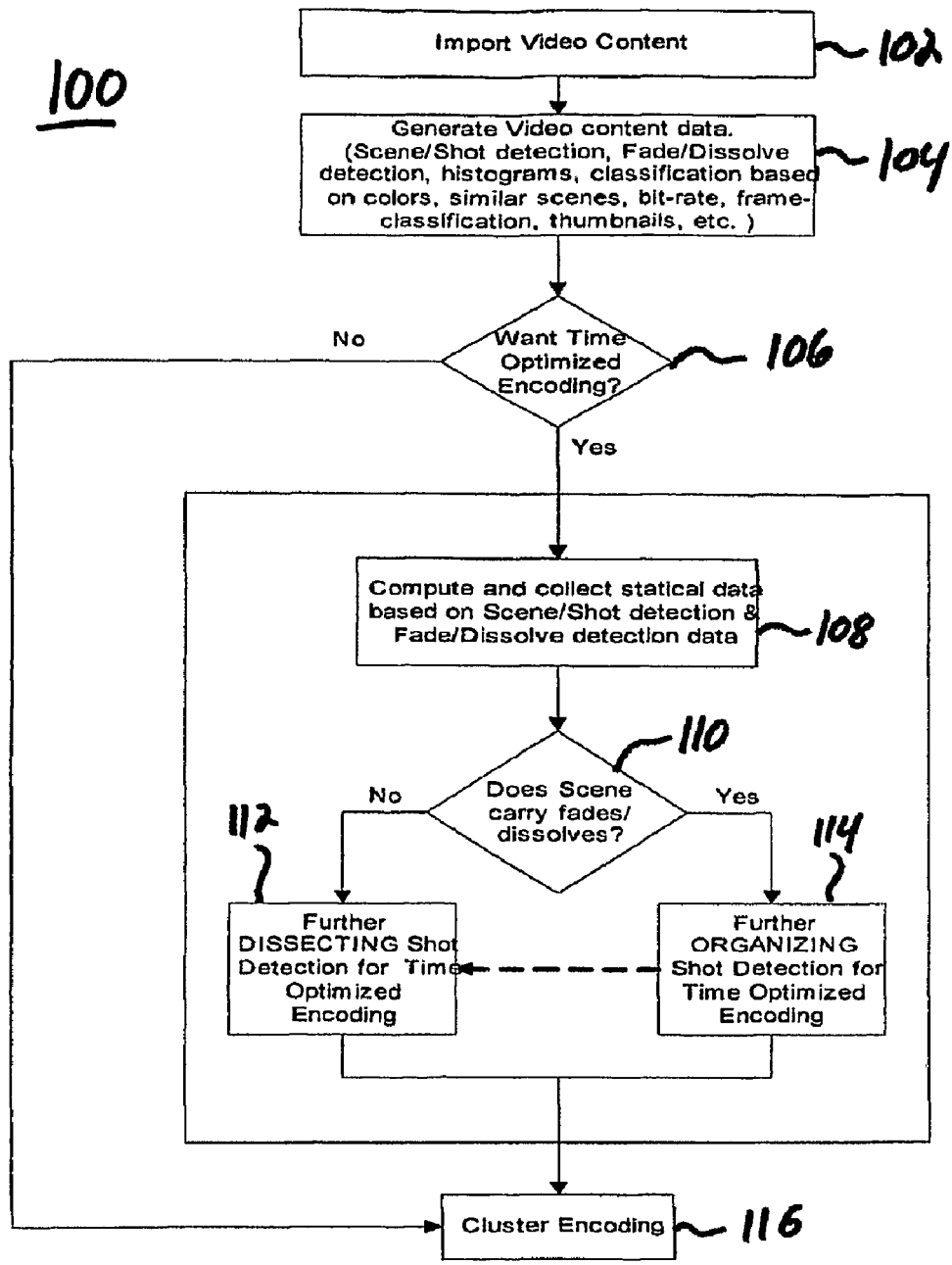
FIG. 7 is an flowchart illustrating an encoding process in accordance with the present disclosure.

Referring now to FIG. 7, a flowchart illustrating the encoding process 100 in accordance with the present disclosure is shown. Initially, at step 102, the encoding arrangement 10 imports or receives video content such as, but not limited to, feature film content. Next, at step 104, the encoding arrangement 10 generates video content data based on the imported video content. Exemplary video content data may include, but is not limited to, scene and/or shot detection, fade and/or dissolve detection, histogram generation, classification based on scene colors (e.g., dark and/or red colored scenes are traditionally more complex to process), identification of similar scenes, frame classification (e.g., noisy frames with many moving object such as a tree with leaves blowing), thumbnail generation and the like. The video content data may be generated by the preprocessor 14 or by a user via the GUI 12. Afterwards, at step 106, the encoder arrangement 10 queries the user about whether the user would like the video content to be compressed or encoded using time optimized encoding. If not, the encoding arrangement 10 initiates, at step 116, a conventional cluster encoding process as known by those skilled in the art. If time optimized encoding is desired, the encoding arrangement 10, at step 108, computes and collects statistical data based on scene and/or shot detection as well as fade and/or dissolve detection. Next, at step 110, the encoding arrangement 10 processes the statistical data to determine if a given scene in the video content contain fades and/or dissolves. If the scene does not contain fades or dissolves the encoding arrangement, at step 112, further determines if the scene is a short, average or long scene and dissects the scene, as appropriate, based on GOP size and GOP type. If a scene does contain fades or dissolves the encoding arrangement, at step 114, organizes scenes containing fades or dissolves in accordance with their length. Afterwards, the encoding arrangement 10 groups the scenes having fades and/or dissolves, the dissected scenes, and the non-dissected scenes, as discussed above, and distributes the scenes, at step 116, to the nodes 28-32 of clusters 22-26 for time optimized encoding in accordance with the present disclosure.

Although the embodiment which incorporates the teachings of the present invention has been shown and described in detail herein, those skilled in the art can readily devise many other varied embodiments that still incorporate these teachings. Having described preferred embodiments for a system and method for packaging and transporting essence files, metadata files and service data files using an intelligent edge device, it is noted that modifications and variations can be made by persons skilled in the art in light of the above teachings. It is therefore to be understood that changes may be made in the particular embodiments of the invention disclosed which are within the scope of the invention as outlined by the appended claims.

What is claimed is:
1. A method for encoding video content, the method comprising the steps of:
receiving the video content;
segmenting the video content into a plurality of scenes;
detecting if a scene has one of a short, average and long length;
dissecting a scene having a long length into a first scene segment and a second scene segment, the first scene segment having an average length and the second scene segment not exceeding an average length; and
encoding the dissected scene segments in parallel.

2. The method of claim 1, wherein the step of dissecting further comprises the step of:

dissecting the scene based on a group of pictures characteristic in the scene.

3. The method of claim 2, wherein the group of pictures characteristic is a group of pictures type.

4. The method of claim 2, wherein the group of pictures characteristic is a group of pictures size.

5. The method of claim 1, wherein the step of encoding further comprises the steps of:

grouping the second scene segment with a scene having a short length;

encoding the grouped second scene segment and the short-length scene in parallel with the first scene segment.

6. The method of claim 5, wherein the step of encoding further comprises the step of:

encoding the grouped second scene segment and the short-length scene in parallel with the first scene segment and in parallel with an average-length scene.

7. The method of claim 1, wherein the step of detecting further comprises the step of:

detecting if a scene contains one of a fade effect and a dissolve effect.

8. The method of claim 7, wherein the step of encoding further comprises the step of:

initiating the encoding of a scene containing one of the fade effect and dissolve effect prior to encoding the dissected scenes in parallel.

9. An apparatus for encoding video content, the apparatus comprising:

means for receiving the video content;

means for segmenting the video content into a plurality of scenes;

means for detecting if a scene has one of a short, average and long length;

means for dissecting a scene having a long length into a first scene segment and a second scene segment, the first scene segment having an average length and the second scene segment not exceeding an average length; and means for encoding the dissected scene segments in parallel.

10. The apparatus of claim 9, wherein the means for dissecting further comprises:

means for dissecting the scene based on a group of pictures characteristic in the scene.

11. The apparatus of claim 10, wherein the group of pictures characteristic is a group of pictures type.

12. The apparatus of claim 10, wherein the group of pictures characteristic is a group of pictures size.

13. The apparatus of claim 9, wherein the means for encoding further comprises:

means for grouping the second scene segment with a scene having a short length;

means for encoding the grouped second scene segment and the short-length scene in parallel with the first scene segment.

14. The apparatus of claim 13, wherein the means for encoding further comprises:

means for encoding the grouped second scene segment and the short-length scene in parallel with the first scene segment and in parallel with an average-length scene.

15. The apparatus of claim 9, wherein the means for detecting further comprises:

means for detecting if a scene contains one of a fade effect and a dissolve effect.

16. The apparatus of claim 15, wherein the means for encoding further comprises:

means for initiating the encoding of a scene containing one of the fade effect and dissolve effect prior to encoding the dissected scenes in parallel.

* * * * *